July 29, 1930.  C. E. FOSTER  1,771,533
OPTICAL PYROMETER
Filed Nov. 6, 1926
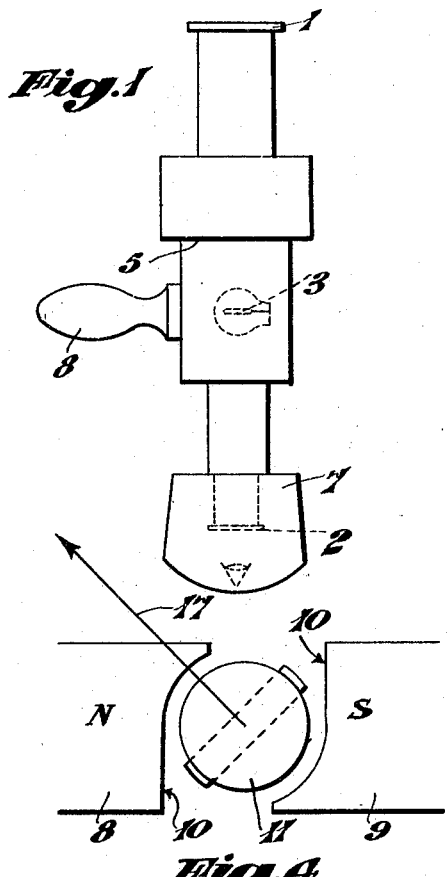
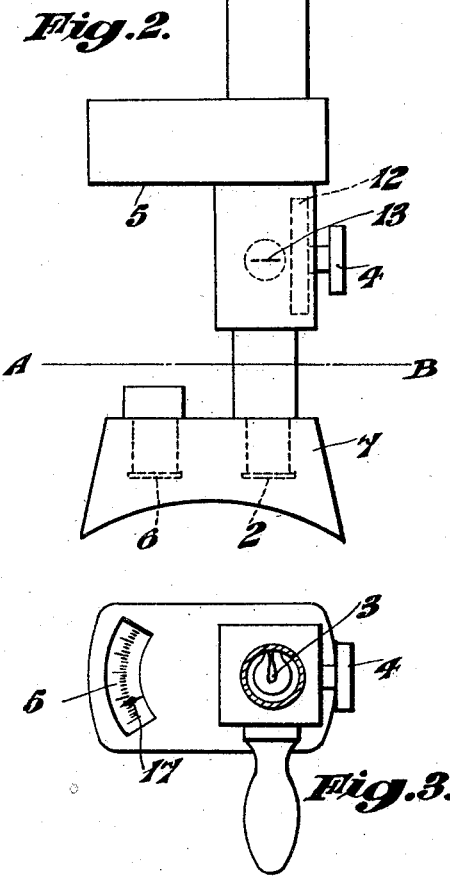
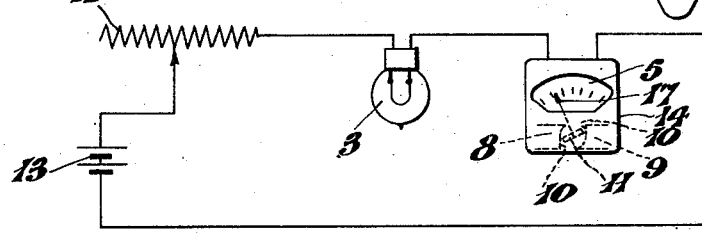
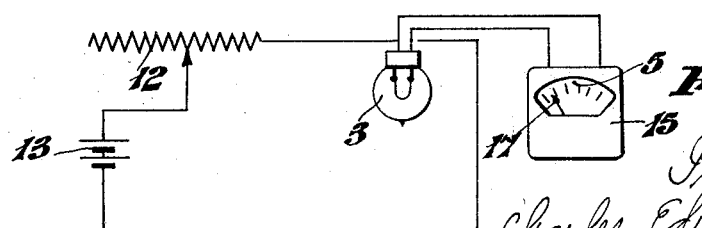
Inventor
Charles Edwin Foster
By B. Singer, Atty.

Patented July 29, 1930

1,771,533

UNITED STATES PATENT OFFICE

CHARLES EDWIN FOSTER, OF LETCHWORTH, ENGLAND

OPTICAL PYROMETER

Application filed November 6, 1926, Serial No. 146,738, and in Great Britain November 19, 1925.

This invention relates to optical pyrometers of the "disappearing filament" type.

In the simplest form of this type of instrument current from a battery is passed through a variable rheostat, the filament to be heated, and a milliammeter. By the position of the contact on the rheostat the current to the filament is varied to secure the desired matching of the filament against the hot body the temperature of which is to be measured. Such temperature is measured directly on the scale of the milliammeter.

With this simple circuit all that portion of the scale of the milliammeter is useless below the lowest reading represented by the distance the milliammeter needle travels under the influence of the current required to be passed through the filament to heat the same up to the lowest temperature reading on the milliammeter scale. One method of overcoming this disadvantage was to employ the device of a mechanical "set back" of the zero so as to make the temperature range occupy the whole scale. By the use of such a device there was no means of checking the true zero and therefore there existed an element of uncertainty and possible error by reason of the fact that the "set back" imposed a large and continuous torsion on the instrument springs and such could therefore not be relied upon to be free from creep and change in zero.

This difficulty has been surmounted by making the lamp filament one of the arms of a Wheatstone bridge and using the milliammeter as the bridge galvanometer in the manner described in U. S. patent to Schofield 1,560,864, of November 10, 1925.

The object of the present invention is to provide a further and simple method of overcoming the scale difficulty.

According to the present invention I overcome the difficulty by providing means whereby the turning movement of the coil of an indicating instrument having an indicating finger carried by a coil moving in the poles of a permanent magnet, such as by making the magnetic field of a moving coil of a milliammeter definitely non-uniform or by using a voltmeter across the lamp terminals, so that the first increments of current only produce a predetermined and reduced deflection coil. This may be effected in practice when using a milliammeter as the indicating instrument by suitably cutting away one pole horn or two diametrically opposite pole horns or a similar effect might be produced by suitably shaping the core round which the moving coil rotates. Alternatively the distribution of the magnetic field might be approximately uniform radially as is usual the control springs being then arranged so that they have a non-uniform law of resistance to the rotation of the moving coil.

With the "cut away" pole pieces the first increments of current would only produce proportionately smaller deflections of the coil so that the position occupied by the first temperature division will be much nearer to zero and there would thus be a larger proportion of the scale length usefully employed.

However effected it is desirable according to the present invention that an indicating instrument be used in which the movement of the pointer for a given increment of current in the neighbourhood of zero is not more than two thirds of the movement for a similar increment near the centre of the scale.

In practice the construction can be such as will result in the sensitivity of the instrument at the centre of the scale being at least 50% greater than the sensitivity at the beginning of the scale, that is to say the angular deflection for a given current in the neighbourhood of zero would be not more than two-thirds of the angular deflection for a similar increment of current at the centre of the scale.

In an instrument according to this invention the indicating instrument may be mounted upon the telescope so as to form part of the structure. I may also incorporate with the telescope an eye shield having two eye holes in one or both of which is fitted an eye piece. The additional hole is for the purpose of watching the movement of the coil moved pointer. By fitting this additional hole with an eye piece the scale of the instrument can be magnified and brought to an apparent greater distance so that the user may make the actual reading without moving his head from the telescope.

In order that the invention may be clearly understood the same will now be described by aid of the accompanying drawings in which:—

Figure 1 is a side elevation,

Figure 2 a plan and Figure 3 an end section taken on the line 3—3 of Figure 2 of an optical pyrometer according to one embodiment of this invention.

Figure 4 is a diagrammatic view illustrating one way of carrying the invention into effect viz, by suitably shaping or cutting away two diametrically opposite pole horns of the milliammeter.

Figure 5 is a diagram of the circuit when an ammeter is used as the indicating instrument and Figure 6 a similar diagram when a voltmeter is used as the indicating instrument.

In the example illustrated in Figures 1 to 3 the objective lens of the telescope is indicated at 1 and the eye-piece at 2, the lamp filament being arranged intermediately and indicated at 3, the usual rheostat 12, controlling the current to such filament being operated by the knob 4.

In this example the milliammeter is mounted directly upon the tube of the telescope, its scale, indicated at 5, being situated to one side of such tube. So that the scale 5 may be read without taking the eye off the filament 3, an additional eye-piece 6 is provided such eye-piece being incorporated with an eye-shield 7 common to both eye-pieces 2 and 6. The view obtained when looking through both eye-pieces is illustrated in Figure 3.

As shown in Figure 4 the pole horns 8 and 9 are cut away as at 10 so that portions of them will be at gradually increasing distances from the axis about which turns the coil 11 carrying the indicating finger 17, this producing the effect that the first increments of current only produce a predetermined and reduced deflection of the coil 11.

In the diagram of the circuit shown in Figure 5, 13 is a battery, 12 a variable resistance, 3 a filament lamp and 14 a milliammeter having a scale 5.

Figure 6 is a similar diagram with a voltmeter calibrated as the indicating instrument in place of the milliammeter, 13 is a battery, 12 a variable resistance, 3 a filament lamp and 15 a voltmeter having a scale 5.

The method illustrated by Figure 6 has the advantage that owing to the increase in the resistance of the filament itself the law of change of voltage is steeper than that of changes of current.

This may be explained numerically as follows:—

Assuming that the instrument employed has a uniform scale the current for 700° C. is 0.44 ampere while that for 1200° C. is 0.62 ampere. With this measurement of current the useless fraction of the scale is 0.44 divided by 0.62 which equals 71%. If voltage is measured instead of current, the voltage corresponding to 700° C. is 0.475 and that to 1200° C. is 0.860. The useless portion of the scale which is then 0.475 divided by 0.860 only represents 55%. If an instrument is used having a non-uniform scale there will still be the same relative advantage.

What I claim and desire to secure by Letters Patent is:—

1. An optical pyrometer having in combination an indicating instrument having a calibrated scale over which a finger carried by the coil moves, the coil moving between the poles of a permanent magnet, means for varying the magnetic field to produce a non-uniform movement of the indicating finger during its initial movement, a telescope, two eye pieces, an electric filament lamp, a battery, means for regulating current through the lamp from the battery, the indicating instrument being mounted in the telescope with its scale under one eye piece, and the electric filament lamp between the other eye piece and the objective of the telescope.

2. An optical pyrometer having in combination a voltmeter having a calibrated scale over which a finger carried by the coil moves, the coil moving between the poles of a permanent magnet, a telescope, two eye pieces, an electric filament lamp, a battery, a rheostat in the battery and lamp circuit, the voltmeter being mounted in the telescope with its scale under one eye piece, and the electric filament lamp between the other eye piece and the objective of the telescope.

3. An optical pyrometer having in combination an indicating instrument having a calibrated scale over which a finger carried by the coil moves, the coil moving between the poles of a permanent magnet, the air gap between the moving coil and the magnet being greater at one end of the movement of the coil than at the other, a telescope, two eye pieces, an electric filament lamp, a battery, means for regulating current through the lamp from the battery, the indicating instrument being mounted in the telescope with its scale under one eye piece, and the electric filament lamp between the other eye piece and the objective of the telescope.

In witness whereof I affix my signature.

CHARLES EDWIN FOSTER.